Patented Jan. 16, 1951

2,538,345

UNITED STATES PATENT OFFICE 2,538,345

PROCESS FOR THE MANUFACTURE OF ALUMINUM HALIDE CATALYSTS

Thomas H. Whaley, Jr., Bartlesville, Okla., assignor to Phillips Petroleum Company, a corporation of Delaware No Drawing. Application August 24, 1945, Serial No. 612,540

7 Claims. (Cl. 18—47.2)

The present invention relates to an improved process for the manufacture of catalysts for use in hydrocarbon conversion processes.

In many hydrocarbon conversion processes, such as, for example, cracking, isomerization, alkylation, polymerization, Friedel and Crafts reactions, etc., catalysts are employed to accelerate the rate of reaction. Of the catalysts commonly employed in these reactions, aluminum chloride is of increasing importance. Aluminum chloride as generally used is in the form of a fine powder, which may be suspended in the hydrocarbons to form a slurry, or in the form of large lumps which are homogeneous or supported on a carrier material. Solid aluminum chloride is sometimes admixed with or deposited on Raschig rings or other inert forms to obtain a catalyst bed having sufficient permeability to allow flow of hydrocarbon liquids or vapors therethrough. The lumps of solid aluminum chloride are more or less porous and are subject to coalescence or fusion into a compact mass of relatively poor catalytic activity. During the conversion process aluminum chloride forms a sludge or hydrocarbon complex. As the catalyst in admixture with inert solid material is converted to sludge, the sludge is deposited on the inert material, hindering the action of the catalyst. Powdered aluminum chloride is not well adapted for use in a stationary catalyst bed since a stationary mass of the powdered catalyst is relatively impervious and is subject to caking into a solid mass. When used as a suspension in the hydrocarbon reactants a serious corrosion and erosion problem is encountered. The aluminum chloride suspension in motion literally cuts the apparatus to pieces, resulting in very short equipment life. The corrosion and erosion is especially severe on agitators, pumps, valves and piping handling the suspension or slurry and on the catalyst cases at points of contact with moving aluminum chloride. Some difficulty is encountered also in retaining the powdered aluminum halide in suspension, the powder tending to collect and agglomerate in the equipment at places where there is insufficient flow or agitation to keep the particles separate and in suspension and to form cakes or lumps which are not readily resuspended.

It has been proposed heretofore to provide an active bed of aluminum chloride catalyst by subliming aluminum chloride upon a porous inert carrier. While the catalyst prepared in this manner is sometimes satisfactory when first put in use, it is subject to some extent to the objections set forth in regard to the use of aluminum chloride deposited on Raschig rings. In many cases, the catalysts formed in this manner soon show inferior activity due to the absorption of the sludge, formed particularly when aluminum chloride is used, on the porous catalyst carrier. A further disadvantage of these catalysts arises from the fact that some porous carriers, otherwise suited as catalyst carriers, promote undesirable reactions or adversely affect the desired hydrocarbon conversion.

In my copending patent application, Serial No. 460,861, filed October 5, 1942, of which this is a continuation-in-part, and which issued October 9, 1945 as Patent No. 2,386,524, is disclosed an aluminum halide catalyst in the form of fibres or threads. The present invention is directed to the preparation of compact solid masses of aluminum halides, preferably in the form of drops, pellets or beads having low surface-volume ratios. The drops, pellets or beads produced in accordance with this invention, as opposed to conventional lump forms of aluminum halide, are substantially non-porous and of a form approaching minimum surface area per unit volume for any given size particle. Advantages of the catalyst produced by my process arise from the fact that the particle structure is such that it is very resistant to crushing, having high mechanical strength, and may be transferred in the equipment without serious erosive action. The catalyst produced by my process may be used in stationary beds or in moving beds with many advantages over the conventional aluminum halide catalysts. When used in stationary beds, the catalyst allows free flow of reactants through the catalyst bed without substantial movement of the particles. Being in an extraordinarily dense form, the aluminum halide particles do not readily crush to form objectionable powdered aluminum halide. Also the drops, beads or pellets, when kept in anhydrous condition, are free flowing and, possessing extraordinarily high density and mechanical stability, are particularly useful for moving catalyst beds. Heretofore, moving aluminum halide catalysts have been possible only by use of powdered catalyst, the disadvantages of which are discussed hereinabove. An important contribution to the art of catalytic conversion of hydrocarbons with aluminum halide catalysts is made, therefore, by the present invention, which provides a solid aluminum halide catalyst having high density and mechanical stability capable of free flow without serious erosion, and capable of self support under many reaction conditions. The catalyst produced by my process is, therefore, superior in many respects to the lump or powdered forms used heretofore.

In addition to the advantages of the catalyst produced by my process in certain conversion processes, it possesses advantages in the transportation of aluminum halides from the place of manufacture to the point of use and in handling prior to use. The drops, pellets or beads of aluminum halide may be made in accordance with this invention and shipped in drums or other suitable shipping containers to the hydrocarbon conversion plant where they may be converted to one of the conventional forms prior to use in the process. For example, the drops, pellets or beads may be vaporized and the vapors deposited on a particulate carrier material, as alumina, for use in conventional manner. The drop, pellet or bead form is particularly useful in this instance in the transportation and handling of the aluminum halide prior to use. There is little tendency for the drops, pellets or beads in anhydrous form to disintegrate or cake during transportation. The free flowing quality of the catalyst makes it particularly easy to empty the catalyst containers at the point of use and to transfer the catalyst to the process equipment.

Other objects and advantages will be evident from the following detailed disclosure.

The aluminum halides are aluminum fluoride, M. P. 1040° C.; aluminum bromide, M. P. 97.5° C.; aluminum iodide, M. P. 191° C.; and aluminum chloride, which sublimes at 178° C. at atmospheric pressure but has a melting point of about 194° C. at 5.2 atmospheres pressure. Of these halides, the chloride, bromide, and iodide are preferred as catalytic materials for use in accordance with my invention.

In practicing the process of my invention, the aluminum halide is rendered plastic, preferably by heating to a temperature in the region of its melting point or above under sufficient pressure to substantially preclude vaporization of the aluminum halide.

The plastic or molten aluminum halide is then formed into small compact masses having a low ratio of external surface to volume for a given particle size, referred to herein as pellets, of small diameter to yield a product similar in appearance to glass beads. These pellets may range from very small diameter, e. g., 0.1 inch or smaller to a diameter of about 0.5 inch, or larger; preferably the pellets have a diameter of 0.2 to 0.4 inch. In general, the pellets may be formed in the manner of manufacture of glass beads, lead shot, or pharmaceutical pills, certain precautions being necessary as will be described more fully hereinafter.

Because of the corrosive properties of molten aluminum chloride, the vessel in which it is heated or fused should be made of or lined with a material resistant to corrosion by the aluminum chloride. Among the materials of construction which are generally suitable are alloys of iron containing high percentages of silicon or nickel; certain alloys of nickel, copper, and chromium, as well as other alloys containing high percentages of one or more of these metals; alloys of tungsten; certain cast bronzes; and deoxidized copper, preferably containing a small percentage of phosphorus. Most of these materials are preferably fabricated by casting to the desired shape. Corrosion-resistant linings of glass, resins, cement of highly siliceous material, tungsten, alundum, tungsten carbide, etc. may be used. Since the temperatures required to plasticize the preferred halides (the chloride, bromide, and iodide) are relatively moderate, the temperature resistances of the materials are not critical limiting factors in their selection. Moderate pressure is maintained on the molten aluminum halide to prevent excessive vaporization or subliming when heating the halide to plastic or molten state. A pressure of 50 to 150 pounds per square inch gauge is generally sufficient in the case of aluminum chloride; the aluminum bromide and iodide may be worked at substantially atmospheric pressure but preferably are maintained under superatmospheric pressure up to about 100 pounds per square inch gauge.

As a specific example of a method of preparing an aluminum halide in the form of pellets in accordance with my invention, anhydrous aluminum chloride is heated in a closed vessel to a temperature of 200° C. in an atmosphere of dry nitrogen. The molten aluminum chloride is admitted to a heated extrusion device of conventional design, wherein mechanical pressure is applied to force the plastic aluminum chloride through an orifice of approximately the diameter desired for the finished pellet, equipped with means for shearing, breaking, or interrupting the flow of aluminum chloride to form segmental particles having a length approximately equal to the diameter of the extruded aluminum chloride. Upon heating to 200° C. under pressure, aluminum chloride attains a very viscous fluid state which may be handled as a plastic. When extruded in conventional plastic extrusion apparatus, the extruded portion tends to puff up to form a very porous mass. The puffing tendency is overcome in the present process by the use of pressure on the plastic mass in excess of the vapor pressure of aluminum chloride during the period required to cool the aluminum chloride below its vaporization temperature (178° C.) at atmospheric pressure. This produces an extraordinarily dense product which retains its dense properties at ordinary temperatures. The aluminum chloride pellets produced as described above are discharged into a cooling chamber in which cooled nitrogen at a pressure of about 75 pounds per square inch gauge is continuously circulated.

The orifice of the extrusion device is particularly subject to the erosive action of the molten aluminum chloride and is suitably formed of tungsten carbide or alundum, which materials are extremely resistant to erosion. The pellets formed by the extrusion device are rapidly cooled to solid condition by the relatively cold inert gas maintained under a pressure in excess of the vapor pressure of the aluminum chloride. The pressure in the cooling chamber precludes sublimation of the aluminum chloride and expansion of the plastic aluminum chloride to any appreciable extent. A compact pellet having good structural properties is thereby formed.

Hydrogen chloride may be employed as the inert gas and may be in some cases the preferred inert gas for cooling the aluminum chloride pellets since it acts as an activator for the catalyst. Similarly, the other hydrogen halides may be preferred as atmospheres in the manufacture of the aluminum bromide and aluminum iodide catalysts. While these gases may not be, strictly speaking, inert in the chemical sense, they do not, when properly correlated with the aluminum halide being treated, have a deleterious effect on the catalyst. Other gases which are not harmful to the catalyst may be employed, for example, hydrocarbon vapors, chlorine, hydrogen, and the rare gases. The gases brought into contact are in any case anhydrous and free from oxygen or other deleterious contaminants. Solution of gas in the molten aluminum chloride should be avoided as much as possible as the dissolved gases reduce the density of the pellet and may cause undesirable bubbles or pores in the pellet which seriously reduce its mechanical strength and stability. The expedient of cooling the pellet under pressure minimizes the tendency of bubble formation after the pellet is formed.

Aluminum bromide and aluminum iodide, both of which may be fused at atmospheric pressure, present less difficulty in pellet formation than does aluminum chloride and less tendency for the pellet to expand after formation.

The pellets of aluminum halide may be manufactured by the formation of drops of the aluminum halide and cooling of the drops to pellets in a dry, non-deleterious atmosphere. The fluid aluminum halide may be allowed to escape from the retort, i. e., the vessel in which it is heated, or some suitable associated apparatus, into an inert atmosphere through openings which produce drops. Apparatus of this nature has been used in the formation of lead shot. The molten aluminum halide may be poured onto a heated foraminous plate having openings therethrough, preferably somewhat smaller at the outlet than at the inlet. The action of gravity upon the molten aluminum halide causes drop formation at the outlet side of the openings. The drop formation may, of course, be induced by or result from the action of suitable mechanical means. The drops of aluminum chloride may be subjected during formation, as well as after formation, to the cooling action of a stream of substantially dry inert gas. Inert liquids may also be employed for cooling of the pellets, particularly the halogenated hydrocarbons. The inert gas or liquid employed may be circulated in such a manner as to aid in the pellet formation; when using gas, the circulation is preferably countercurrent to the direction of travel of the drops of plastic aluminum halide; with liquid, agitation of the liquid coolant is sufficient to aid in the formation of substantially spherical pellets from the plastic drops. Sufficient pressure is maintained in the cooling chamber to insure formation of a compact pellet. The pressure so maintained is in excess of the vapor pressure of the aluminum halide at the temperature employed in the formation of the plastic aluminum halide pellets.

Another method which may be employed in forming the pellets involves the use of centrifugal force to cause the fluid aluminum halide to form plastic drops which are cooled in an inert cooling atmosphere to pellets. For example, the molten aluminum halide may be thrown by the action of centrifugal force from the periphery of a rotating circular disk in the form of small drops. This principle is relatively well known and needs very little description. The aluminum halide is revolved at a relatively rapid rate on a circular plate. Small particles break away from the revolving mass and are thrown outwardly from the edges of the plate. The particles assume a substantially spherical shape; size may be controlled by the fluidity of the plastic mass and the speed of rotation. The particles are given a rolling action by the plate as they leave the revolving mass resulting in the formation of spherical plastic particles, which, upon cooling result in dense pellets. Apparatus of this type may be used to produce pellets suitable for use as catalysts in accordance with my invention.

The pellets of aluminum halide may be produced in machines similar to those used for the manufacture of catalyst pellets of silica gel or synthetic alumina. In the manufacture of pellets by this means, the material to be pelleted is charged in small predetermined quantities into molds to which mechanical pressure is applied to form the pellet. The manufacture of aluminum halide pellets, particularly aluminum chloride pellets, by this method require conditions not employed in the manufacture of conventional catalyst pellets. First, the aluminum halide must be rendered plastic; conventional pellets from other catalytic materials are formed merely by compression of powders. Second, a pressure higher than the vapor pressure must be maintained on the pellet until it has cooled below the vaporization temperature (178° C. for aluminum chloride); conventional pellets made from other catalytic materials require no cooling and pressure is not required after catalyst formation. With apparatus of this nature, the aluminum halide may be charged in plastic state to the mold in required quantities. The mold itself may be cooled or the pellets may be discharged from the mold into a cooling atmosphere. Sufficient pressure is maintained during the cooling period to prevent vaporization. Alternatively, powdered aluminum halide may be charged to heated molds which render the aluminum halide plastic during the molding operation. The pellets thus formed are cooled in the mold or in an inert atmosphere. The pellets may also be molded in suitable molds in an inert atmosphere under sufficient pressure to substantially prevent vaporization, without the use of mechanical pressure. Two types of molding machines, using mechanical pressure, which may be satisfactorily employed are the ram type and the roller type. In the ram type, the aluminum halide is placed in the mold and pressure applied with a rod or ram which carries a complementary portion of the mold. In the roller type, the plastic mass of aluminum halide is fed onto two cooperating, counter-rotating rollers which are pressed tightly together at their points of contact with complementary recesses in each to receive and mold the aluminum halide into pellets of the desired size and shape.

The aluminum halide catalyst in the pellet form produced by my process may be advantageously used in hydrocarbon conversion processes in which the aluminum halide may be maintained normally in solid form. The catalyst is capable of self-support when used under conditions of temperature below the softening or fusion point. In these operations a catalyst chamber is provided with means for support of the catalyst mass, either in its entirety or in sections. The catalyst chambers are generally provided with a foraminous plate to support the solid catalyst mass and may be provided at intervals with foraminous partitions which retain the catalyst while allowing free passage of the hydrocarbons therethrough. The catalyst case is filled with the pellet catalyst and provision may be made for removal of particles of the catalyst carried in the hydrocarbons as the pellets disintegrate with use. Fresh catalyst is added as needed to replenish the catalyst bed, the fresh catalyst being introduced preferably at the hydrocarbon outlet. The fresh catalytic material thereby acts as a filtering agent for small catalyst particles, retaining them in the catalyst zone until spent. The fresh catalyst may be supplied to the catalyst chamber continuously or intermittently. Preferably the flow of hydrocarbons through the catalyst bed is upward through the catalyst pellets. This allows any sludge formed in the reaction to separate from the catalyst at the point at which the sludge formation is generally greatest and prevents its deposition on the catalyst in the remainder of the catalyst bed. Fresh pellets added to the top of the bed are of full size, with particle size decreasing from the top to the bottom of the bed due to size reduction with use. The very small pellets at the bottom of the bed may be drawn off with the sludge.

The pellets of aluminum halide catalyst produced by my process may also be used in a moving catalyst bed. Fresh catalyst may be introduced continuously or intermittently to the top of the catalyst bed and used catalyst continuously or intermittently removed from the bottom of the bed. The shape and density of the pellets are conducive to free flow of the catalyst. The hydrocarbon flow may be in either direction through the catalyst bed. The used catalyst and sludge are preferably removed together from the bottom of the catalyst bed. The sludge may then be separated from the catalyst, as by washing with an inert hydrocarbon, and the clean catalyst recycled to the catalyst zone, preferably at a point intermediate the ends of the catalyst bed.

In some catalytic processes in which the aluminum halides are used as catalysts, the aluminum halide is dissolved in the hydrocarbon reactants; in others the hydrocarbon is passed over aluminum halide prior to introduction of the hydrocarbon to the catalyst chamber to "saturate" the hydrocarbon with the aluminum halide. The catalytic material produced by my process may be advantageously used by either of these procedures. The pelleted aluminum halide used in this manner possesses several advantages over the lump or powdered form as previously pointed out.

As a less desirable modification of the method of use of the catalytic materials produced by my process, the pellets may be suspended in the hydrocarbon stream in the catalytic reaction zone in much the same manner as powdered aluminum halides. While there is still the erosion problem mentioned in discussion of the powdered halide, the erosion is less severe than with the powdered halide. The smooth surfaces of the dense pellets are an important factor in the lessening of the erosion problem. The physical form of the aluminum halide pellets is believed to have a direct bearing upon the reduction of corrosion obtaining when the pellets are employed in suspension.

I claim:

1. A process for manufacturing smooth, hard, dense catalytic pellets of aluminum halide which comprises heating aluminum halide under a superatmospheric pressure in excess of the vapor pressure of said halide and up to 150 p. s. i. g. so as to form a fluid mass, thereafter forming said fluid mass into pellets between 0.1 and 0.5 inch in diameter while under said pressure, and cooling said pellets to a temperature below the softening point of said halide at atmospheric pressure while under said superatmospheric pressure so as to obtain said smooth, hard, dense aluminum halide pellets.

2. A process for manufacturing smooth, hard, dense catalytic pellets of aluminum chloride which comprises heating aluminum chloride under a superatmospheric pressure in excess of the vapor pressure of said chloride and up to 150 p. s. i. g. so as to form a fluid mass, thereafter forming said fluid mass into pellets while under said pressure, and cooling said pellets to a temperature below the softening point of said chloride at atmospheric pressure while under said superatmospheric pressure so as to obtain said smooth, hard, dense aluminum chloride pellets.

3. A process for manufacturing smooth, hard, dense catalytic pellets of aluminum chloride which comprises heating aluminum chloride to the molten state; forming the molten aluminum chloride into spheres ranging in diameter from 0.1 to 0.5 inch; cooling said spheres in an inert gaseous atmosphere; and maintaining said aluminum chloride under a superatmospheric pressure in excess of the vapor pressure thereof and up to 150 p. s. i. g. during the preceding steps so as to form smooth, hard, dense, spherical pellets.

4. The process of claim 2 in which said pellets are cooled in an ambient inert with respect to aluminum chloride.

5. The process of claim 2 in which said pellets are cooled in nitrogen.

6. The process of claim 2 in which said pellets are cooled in liquid halogenated hydrocarbon.

7. The process of claim 2 in which said pellets are formed by extrusion and division of the extrudate into short lengths.

THOMAS H. WHALEY, Jr.

REFERENCES CITED

The following references are of record in the file of this patent:

UNITED STATES PATENTS

| Number | Name | Date |
| --- | --- | --- |
| 1,146,363 | Statham | July 13, 1915 |
| 1,680,807 | Schultze | Aug. 14, 1928 |
| 2,283,174 | Bates et al. | May 19, 1942 |
| 2,287,029 | Dowdell | June 23, 1942 |
| 2,295,977 | Thomas et al. | Sept. 15, 1942 |
| 2,380,703 | Montgomery et al. | July 31, 1945 |
| 2,386,524 | Whaley | Oct. 9, 1945 |
| 2,398,557 | Reading | Apr. 16, 1946 |